United States Patent Office 3,335,196
Patented Aug. 8, 1967

3,335,196
PREPARATION OF 5,6 - CYCLOPENTANO - 1,2,3,4-TETRAHYDRONAPHTHALENE AND 3-PHENYL-PROPYL-1,2,3,4-TETRAHYDRONAPHTHALENE
Ronald D. Bushick, Glen Mills, Pa., assignor to Sun Oil Company, Philadelphia, Pa., a corporation of New Jersey
No Drawing. Filed June 6, 1966, Ser. No. 555,242
9 Claims. (Cl. 260—668)

This invention relates in one aspect to the preparation of 5,6 - cyclopentano - 1,2,3,4 - tetrahydronaphthalene (herein CPTN) which is useful as an intermediate in the preparation of carboxylic acids, anhydrides of the latter, and substituted adamantanes. The invention relates in another aspect to a method of preparing 3-phenylpropyl-1,2,3,4-tetrahydronaphthalene, (herein PPTN) the latter being useful in that it can be readily converted to CPTN.

In my copending application Ser. No. 534,428, filed Mar. 15, 1966, it is disclosed that 1,2,3,4-tetrahydronaphthalene disproportionates in the presence of HF—$BF_3$ or HF—$BCl_3$ under certain conditions to form octahydroanthracene (herein OHA) and octahydrophenanthrene (herein OHP). The reaction which occurs is as follows wherein the product is indicated as OHA. An analogous reaction could be written for the formation of OHP.

EQUATION I

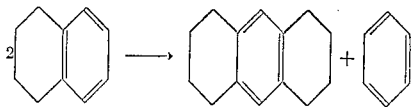

It is also disclosed in the aforesaid application that indan disproportionates in the presence of HF—$BF_3$ or HF—$BCl_3$ under certain conditions to form as-hydrindacene. Equation II below depicts this reaction.

EQUATION II

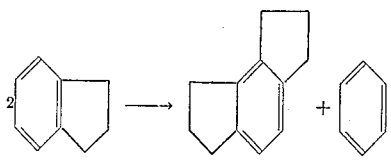

If one treated an equimolar mixture of 1,2,3,4-tetrahydronaphthalene and indan with HF—$BF_3$ or HF—$BCl_3$ under conditions appropriate for the above reactions it would be expected that three products would be obtained. One product would be a $C_6$–$C_6$–$C_6$, i.e., OHA, formed by two moles of 1,2,3,4-tetrahydronaphthalene reacting together as in Equation I above. A second product would be a $C_5$–$C_6$–$C_5$, i.e., as-hydrindacene, formed as depicted in Equation II above. The third product would be a $C_5$–$C_6$–$C_6$, i.e., CPTN, formed by reaction of a mole of 1,2,3,4-tetrahydronaphthalene with a mole of indan. This latter reaction can proceed in two ways, i.e., by the transfer of a $C_6$ saturated ring of 1,2,3,4-tetrahydronaphthalene to indan or by the transfer of a saturated $C_5$ ring from indan to 1,2,3,4-tetrahydronaphthalene. The product is the same in either case but since it can proceed in either way one would expect to find that the tricyclics in the reaction product mixture would be 50% $C_5$–$C_6$–$C_6$, 25% $C_6$–$C_6$–$C_6$ and 25% $C_5$–$C_5$–$C_6$. In all the above equations and discussion benzene has been ignored as a product.

I have now made the surprising discovery that treatment of a mixture of 1,2,3,4-tetrahydronaphthalene and indan with HF—$BF_3$ or HF—$BCl_3$ does not give the anticipated results. The tricyclic content of the reaction product mixture is not 50% CPTN as would be expected but rather is about 70–80% CPTN. Conversely the total amount of OHA and as-hydrindacene is not the expected 50% but instead is only 20–30%. Stated in another manner the ratio of CPTN to the total amount of OHA and as-hydrindacene is not the expected 1:1 but is generally about 2–3:1. Thus the ratio is 100–200% higher than anticipated.

The reaction of 1,2,3,4-tetrahydronaphthalene and indan to form CPTN in unexpectedly high proportions is carried out in the presence of HF—$BF_3$ or HF—$BCl_3$ in the following manner. In the description it will be assumed that the catalyst is HF—$BF_3$ but unless otherwise indicated HF—$BCl_3$ is also effective.

The HF should be employed in liquid phase. Although the reaction can be, and preferably is, carried out above the boiling point of HF (19.4° C.) the pressure in the reaction vessel should be sufficient to maintain the HF in liquid phase. All boiling points herein are at 760 mm. Hg absolute pressure unless otherwise stated. Normally the $BF_3$ (B.P.=−101° C.) pressure in the reaction vessel is sufficient to maintain the HF in liquid phase. If not other convenient means can be employed to insure the use of liquid HF, such as pressuring the reaction vessel with nitrogen, etc. The amount of HF employed should be at least 5 moles per mole of 1,2,3,4-tetrahydronaphthalene–indan mixture, but is preferably at least 7 moles, more preferably at least 10 moles, per mole of 1,2,3,4-tetrahydronaphthalene–indan mixture. By moles of 1,2,3,4-tetrahydronaphthalene–indan mixture is meant the sum of the moles of indan and the moles of 1,2,3,4-tetrahydronaphthalene in the mixture. Preferably the HF: 1,2,3,4-tetrahydronaphthalene-indan mole ratio does not exceed about 50:1, although ratios as high as 200:1 or even higher can be used if desired.

The amount of $BF_3$ used should be at least 0.5 mole per mole of 1,2,3,4-tetrahydronaphthalene–indan mixture and is preferably at least 0.6 mole. Although some product is obtained at $BF_3$:1,2,3,4-tetrahydronaphthalene–indan mole ratios between 0.1:1 and 0.5:1, there is a very rapid and sharp increase in yield as the ratio exceeds 0.5:1. More preferably the $BF_3$:1,2,3,4-tetrahydronaphthalene–indan mole ratio is at least 0.75:1. The yield of product is usually maximized at a $BF_3$:1,2,3,4-tetrahydronaphthalene–indan ratio in the range of 0.5:1 to 2.0:1, consequently the amount of $BF_3$ used will normally not exceed 2 moles per mole of 1,2,3,4-tetrahydronaphthalene–indan mixture although amounts as high as 10 moles or even higher, e.g., 100 moles per mole of 1,2,3,4-tetrahydronaphthalene–indan mixture can be used if desired.

The temperature at which the reaction is carried out should be in the range of 0–200° C., preferably 30–160° C., more preferably the temperature is about 40–130° C.

The reaction time can vary considerably. A substantial amount of reaction occurs within 1–2 minutes with additional reaction occurring thereafter at a somewhat slower rate. Preferably the reaction time is at least 10 minutes, more preferably at least 30 minutes. Normally the reaction time will not exceed 10 hours and usually will not exceed 3–5 hours.

The reaction time and temperature are interrelated in that as the temperature increases the time required to obtain equivalent results decreases. Conversely, as the temperature decreases the time increases. Because of this it is impossible to specify any single temperature or time as optimum. On the other hand, for any given time or temperature it is relatively easy to determine from a few experiments the optimum value of the other variable.

The 1,2,3,4-tetrahydronaphthalene content of the 1,2,3,4-tetrahydronaphthalene–indan mixture starting material will usually be about 50 mole percent (the balance being indan of course) since with this amount the proportion of CPTN in the reaction product is maximized. On the other hand, even with a 1,2,3,4-tetrahydronaphthalene content of 10–90 mole percent the amount of CPTN formed is higher than expected. Preferably the 1,2,3,4-tetrahydronaphthalene content is 20–80%, more preferably 30–70%.

As described above three products are formed in significant amounts. One is the $C_5$–$C_6$–$C_6$ tricyclic aromatic CPTN. By tricyclic aromatic is meant a compound having three condensed rings one of which is an aromatic ring. The second product is the $C_6$–$C_6$–$C_6$ tricyclic aromatics OHA and OHP which are referred to collectively herein as OHA. The third product is the $C_5$–$C_6$–$C_5$ tricyclic aromatic as-hydrindacene. The starting materials are $C_6$–$C_6$ dicyclic aromatics and $C_5$–$C_6$ dicyclic aromatics each being half-hydrogenated, i.e., each containing one saturated ring and one aromatic ring.

The reaction can be carried out in any convenient manner using equipment of conventional type. For example the 1,2,3,4-tetrahydronaphthalene–indan starting material is charged to a closed reaction vessel equipped with heating and agitation means. The required amount of HF is then added following which the HF–1,2,3,4-tetrahydronaphthalene–indan mixture is heated to the desired reaction temperature. Next the desired amount of $BF_3$ is added and the vessel is then preferably shaken or the contents thereof otherwise agitated in order to insure efficient contact of the HF—$BF_3$ catalyst with the 1,2,3,4-tetrahydronaphthalene. After adding the $BF_3$ the reaction mass is then maintained at the desired reaction temperature for the desired contact time.

At the end of the reaction period the reaction vessel contains HF—$BF_3$, the three products mentioned previously, some unreacted 1,2,3,4-tetrahydronaphthalene and indan, benzene, and some by-products. The by-products are mainly 5 or 6-(4-phenylbutyl)-1,2,3,4-tetrahydronaphthalene, 4 or 5-(3-phenylpropyl)–indan, 5 or 6-(3-phenylpropyl)-1,2,3,4-tetrahydronaphthalene and 4 or 5-(4-phenylbutyl)–indan but small amounts of other condensed polycyclic compounds are usually formed also. Merely opening the vessel will effect the removal of most of the $BF_3$ (B.P.=−101° C.) and much of the HF if the reaction is carried out above its boiling point (19.4° C.). Any remaining HF and any $BF_3$ dissolved therein can be distilled from the vessel. The OHA, as-hydrindacene, and CPTN can be separated from the other organic materials and from each other by means described hereinafter.

If it is desired to remove the HF as a liquid rather than as a gas the reaction vessel is cooled to below 19.4 C. at the end of the reaction time, assuming that the reaction is carried out above the boiling point of HF. The vessel is then opened, which effects removal of most of the $BF_3$, and the remaining reaction mass is quenched in ice water. Two liquid layers result, an aqueous acid layer and an organic layer. If desired, the acid in this two-phase system can be neutralized by mixing the system with $Na_2CO_3$. The organic layer is then decanted and is preferably washed with water several times to remove any remaining traces of acid or any traces of $Na_2CO_3$. Dilution of the organic layer with a solvent such as pentane facilitates the decanting step.

The three products mentioned previously can be recovered from the organic layer in any convenient manner. One suitable procedure involves an initial vacuum distillation at, for example, 0.1 mm. Hg pressure. All pressures herein are absolute pressures. The by-product benzene (B.P.=83° C.) distills first followed by the unreacted 1,2,3,4-tetrahydronaphthalene (B.P.=206° C.) and indan (B.P.=177° C.). These distillates can be recovered together or separately and put to any use desired. For example, unreacted 1,2,3,4-tetrahydronaphthalene and indan can be recovered separately and recycled to the reaction vessel and again contacted with HF—$BF_3$ for conversion to CPTN. The three products mentioned previously distill off next. CPTN boils at 143–7° C. at 15 mm. Hg, as-hydrindacene boils at 252–3° C. at 758 mm. Hg, and OHA and OHP boil at about 306° C. and 312° C. respectively at 760 mm. Hg. Distillation of the three products mentioned sometimes leaves a small residue of high boiling by-products.

Alternatively the CPTN and other components of the reaction product mixture can be separated by chromatographic techniques. This is the procedure used in the examples hereinafter.

The following examples illustrate the aspect of the invention just described more specifically. The procedure in each run is essentially the same and is as follows.

The reaction vessel is a small reactor equipped with a shaker and heating and cooling means. The reactor is flushed out with nitrogen and is then evacuated. The 1,2,3,4-tetrahydronaphthalene and indan are then charged to the reactor followed by the HF. The amount of 1,2,3,4-tetrahydronaphthalene and indan charged is 0.05 mole of each and is the same in all runs unless otherwise indicated. The reactor is shaken, heated to the desired reaction temperature, and the $BF_3$ is then added. In all runs the $BF_3$ pressure is sufficient to maintain essentially all of the HF in liquid phase. The reactor is then held at the reaction temperature for the desired reaction time, the time being measured from the time of $BF_3$ addition. Shaking of the reactor continues throughout the entire reaction time. At the end of the reaction period the reactor is cooled to 15° C., opened, and the contents thereof quenched in ice. Two liquid layers result, an aqueous acid layer and an organic layer. This two-phase system is neutralized with $Na_2CO_3$ after which the organic layer is drawn off and washed several times with twice its volume of water. The organic layer is then analyzed by vapor phase chromatography.

The following data is presented for each of the runs described in the examples hereinafter. The columns headed "Reaction Product Mixture" show the weight percentage of the indicated product in the reaction product mixture. The latter is all material present at the end of the reaction after removing the HF and $BF_3$. The 1,2,3,4-tetrahydronaphthalene–indan conversion is the weight percentage of the 1,2,3,4-tetrahydronaphthalene–indan starting mixture which reacts to form products of any type. The ratio of CPTN to OHA and as-hydrindacene (referred to in the tables as as-H) is the weight ratio of CPTN in the reaction product mixture to the total amount of OHA and as-hydrindacene in the reaction product mixture. Theoretically this ratio should be 1:1 as explained hereinbefore. The remaining column shows first the percentage of CPTN in the reaction product mixture and secondly (after the dash) the percentage of OHA and as-hydrindacene in the recation product mixture, each percentage being based upon the total amount of CPTN, OHA, and as-hydrindacene in same. For example the result 77%–23% means that of the CPTN, OHA, and as-hydrindacene in the reaction product mixture 77% is CPTN and 23% is OHA and as-hydrindacene. As explained previously theory would predict a result of 50%–50%, assuming of course that the starting material contained 50 mole percent each of 1,2,3,4-tetrahydronaphthalene and indan.

The yields of each tricyclic are not reported but can be calculated by dividing the weight percentage of CPTN, OHA, and as-hydrindacene by 0.34, 0.19 and 0.16, respectively, i.e., the weight percentage of each of these compounds which would be present in the reaction product mixture if the reaction proceeded in the expected manner described previously.

*Example I*

This example is a series of runs at a reaction time of 90 minutes, varying temperatures, and HF:1,2,3,4-tetrahydronaphthalene–indan mole ratio of 10:1 and a $BF_3$: 1,2,3,4-tetrahydronaphthalene–indan mole ratio in the range of .5:1–.8:1. All runs are carried out in the manner previously described and the results are as follows.

It is apparent from the above data that signficant and substantial amounts of CPTN are made under the conditions stated. As in Example I all runs show an unusually high amount of CPTN in the reaction product mixture.

*Example III*

This example is a series of runs showing that smaller amounts of HF or $BF_3$ than those stated significantly reduce the amount of CPTN produced. In Run 442645 (50° C., 90 min.) the HF ratio is as in the prior examples but the $BF_3$ ratio is as in previous examples but the HF:1,2, is only 0.16:1. In the other run shown (70° C., 90 min.) the $BF_3$ ratio is as in previous examples but the HF:1,2,3,4-tetrahydronaphthalene–indan ratio is only 1.4:1.

TABLE III

| Run | Reaction Product Mixture | | | 1,2,3,4-Tetra-hydronaphtha-lene–Indan Conversion | Ratio of CPTN to OHA and as-H | Percent CPTN-Percent OHA and as-H |
|---|---|---|---|---|---|---|
| | CPTN | as-H | OHA | | | |
| 442645 | 3.2 | 0.7 | 0 | 49.4 | 4.6:1 | 82–18 |
| 442655 | 6.4 | 0.3 | 3.7 | 68.8 | 1.6:1 | 62–38 |

TABLE I

| Run | Temp., °C. | Reaction Product Mixture | | | 1,2,3,4-tetra-hydronaphtha-lene–Indan Conversion | Ratio of CPTN to OHA and as-H | Percent CPTN-Percent OHA and as-H |
|---|---|---|---|---|---|---|---|
| | | CPTN | as-H | OHA | | | |
| 442562 | 30 | 4.4 | 0.2 | 2.6 | 76.8 | 1.6:1 | 62–38 |
| 467598 | 30 | 4.0 | 0.4 | 2.3 | 74.9 | 1.5:1 | 60–40 |
| 467597-2 | 30 | 3.6 | 0.4 | 1.8 | 69.2 | 1.6:1 | 62–38 |
| 442644 | 50 | 22.8 | 3.5 | 6.1 | 78.5 | 2.4:1 | 71–29 |
| 454927 | 50 | 23.3 | 4.1 | 9.6 | 90.3 | 1.7:1 | 63–37 |
| 467594 | 50 | 25.7 | 4.0 | 9.3 | 85.3 | 1.9:1 | 66–34 |
| 467593-2 | 50 | 28.8 | 3.0 | 9.4 | 81.2 | 2.8:1 | 74–26 |
| 454933 | 70 | 35.5 | 3.1 | 8.2 | 91.5 | 3.1:1 | 76–24 |
| 454928 | 70 | 33.9 | 4.6 | 7.9 | 93.9 | 2.7:1 | 73–27 |
| 442653 | 70 | 28.8 | 2.1 | 6.6 | 90.3 | 3.3:1 | 77–23 |
| 455007 | 70 | 23.8 | 2.7 | 10.2 | 91.1 | 1.9:1 | 65–35 |
| 455006 | 70 | 23.0 | 2.5 | 7.3 | 92.6 | 2.3:1 | 70–30 |
| 467595-2 | 70 | 37.9 | 2.8 | 9.6 | 92.7 | 3.1:1 | 75–25 |
| 467596 | 70 | 36.4 | 4.3 | 9.5 | 90.1 | 2.6:1 | 73–27 |

It is apparent from the above data that signficant amounts of CPTN are obtained in each run. The amount obtained at 30° C. would have been higher at a longer reaction time. It is also apparent from the data that the amount of CPTN is substantially higher than would be predicted based upon the theoretical reaction.

*Example II*

This example is a series of runs made at the same HF and $BF_3$ ratios as in Example I, at 70° C. and at varying reaction times. The results are as follows:

It is apparent from the above data that smaller amounts of HF and $BF_3$ than as specified herein substantially reduce the amount of CPTN product formed.

*Example IV*

This example is two runs in which the amount of indan in the starting mixture is different than in the prior examples. In Run 454924 only .025 mole of indan is used with .05 mole of 1,2,3,4-tetrahydronaphthalene and in Run 454926 .076 mole of indan and .05 1,2,3,4-tetrahy-

TABLE II

| Run | Time (min.) | Reaction Product Mixture | | | 1,2,3,4-tetra-hydronaphtha-lene–Indan Conversion | Ratio of CPTN to OHA and as-H | Percent CPTN-Percent OHA and as-H |
|---|---|---|---|---|---|---|---|
| | | CPTN | as-H | OHA | | | |
| 454930 | 30 | 27.4 | 3.1 | 6.1 | 81.8 | 3.0:1 | 75–25 |
| 442578 | 60 | 26.0 | 2.5 | 6.3 | 81.8 | 3.0:1 | 75–25 |
| 454929 | 60 | 28.1 | 6.1 | 6.8 | 87.9 | 2.2:1 | 69–31 |
| 454933 | 90 | 35.5 | 3.1 | 8.2 | 91.5 | 3.1:1 | 76–24 |
| 454928 | 90 | 33.9 | 4.6 | 7.9 | 93.9 | 2.7:1 | 73–27 |
| 442653 | 90 | 28.8 | 2.1 | 6.6 | 90.3 | 3.3:1 | 77–23 |
| 455007 | 90 | 23.8 | 2.7 | 10.2 | 91.1 | 1.9:1 | 65–35 |
| 455006 | 90 | 23.0 | 2.5 | 7.3 | 92.6 | 2.3:1 | 70–30 |
| 467595-2 | 90 | 37.9 | 2.8 | 9.6 | 92.7 | 3.1:1 | 75–25 |
| 467596 | 90 | 36.4 | 4.3 | 9.5 | 90.1 | 2.6:1 | 73–27 | dronaphthalene is used. In all other respects the runs are the same as in Example I, the reaction temperature being 50° C. The results of these two runs are as follows:

TABLE IV

| Run | Reaction Product Mixture | | | 1,2,3,4-Tetra-hydronaphthalene–Indan Conversion | Ratio of CPTN to OHA and as-H | Percent CPTN-Percent OHA and as-H |
|---|---|---|---|---|---|---|
| | CPTN | as-H | OHA | | | |
| 454924 | 20.6 | 1.6 | 16.4 | 79.9 | 1.1:1 | 52-48 |
| 454926 | 17.1 | 5.3 | 2.6 | 74.4 | 2.2:1 | 69-31 |

It is apparent from the above data that the invention is applicable to mixtures other than those containing equal amounts of 1,2,3,4-tetrahydronaphthalene and indan. It should be noted that the theoretical ratio of 1:1 applies only to equimolar mixtures of 1,2,3,4-tetrahydronaphthalene and indan. Since the starting mixture in Run 454924 contains a considerable excess of 1,2,3,4-tetrahydronaphthalene the theoretical ratio is actually considerably below 1:1. The excess of indan in Run 454926 also had the effect of reducing the theoretical ratio of CPTN to as-hydrindacene and OHA yet the actual ratio obtained is 2.2:1.

Substantially the same results are obtained when the reaction is carried out under other conditions within the ranges specified previously. Normally the ratio of CPTN to as-hydrindacene and OHA is at least 2:1 and is frequently above 3:1. The yield of CPTN calculated as described herein is usually at least 65% and is often above 75–85%.

Another aspect of the invention is a method for preparing PPTN. This method is the same in all respects as the method described for making CPTN except that the temperature should be in the range of 0–60° C., preferably 20–40° C., and the $BF_3$ (or $BCl_3$):1,2,3,4-tetrahydronaphthalene–indan mole ratio can be as low as 0.1:1, but is preferably not lower than 0.3:1. In other words CPTN is prepared over a temperature range of 0–200° C. and a $BF_3$:1,2,3,4-tetrahydronaphthalene–indan ratio of at least 0.5:1 but within 0–60° C. and a $BF_3$:1,2,3,4-tetrahydronaphthalene–indan ratio of at least 0.1:1 PPTN is also made in significant amounts. The PPTN is readily recovered from the reaction product mixture by chromatographic techniques or by distillation.

This aspect of the invention is illustrated by the results presented below in Table V of five runs previously described in connection with the preparation of CPTN. Table V shows the reaction conditions and also the weight percentage of PPTN in the reaction product mixture, the latter being as previously defined.

TABLE V

| Run | Temp., −° C. | Time, −Min. | HF Ratio | $BF_3$ Ratio | Wt. Percent PPTN in Reaction Product Mixture |
|---|---|---|---|---|---|
| 467598 | 30 | 90 | 10:1 | 0.66:1 | 34.6 |
| 467597-2 | 30 | 90 | 10:1 | 0.50:1 | 29.4 |
| 467593-2 | 50 | 90 | 10:1 | 0.62:1 | 9.9 |
| 442645 | 50 | 90 | 10:1 | 0.16:1 | 18.2 |
| 454926 | 50 | 90 | 10:1 | 0.37:1 | 11.2 |

It is apparent from the above data that PPTN is made in significant amounts by the method described above.

The PPTN formed in the above examples and by the method of the invention is usually a mixture of the 5 and 6 isomers, i.e., 5 or 6-(3-phenylpropyl)-1,2,3,4-tetrahydronaphthalene. It has usually been found that more than half of the mixed isomers is the 6-isomer.

The recovered PPTN can be converted to CPTN by treating same with HF—$BF_3$ at about 50–70° C. using about 10 moles HF and .5 mole $BF_3$ per mole of PPTN. It is also useful as an insecticide against flies and the confused carpet beetle.

The invention claimed is:

1. Method which comprises contacting a hydrocarbon mixture containing 10–90 mole percent 1,2,3,4-tetrahydronaphthalene and 90–10 mole percent indan with liquid HF in combination with $BF_3$ or $BCl_3$ at a temperature of 0–200° C., the amount of HF being at least 5 moles per mole of said mixture and the amount of $BF_3$ or $BCl_3$ being at least 0.5 mole per mole of said mixture, continuing said contacting for a time sufficient to effect formation of 5,6-cyclopentano-1,2,3,4-tetrahydronaphthalene, and recovering the latter compound from the reaction product mixture.

2. Method according to claim 1 wherein the temperature is 30–160° C.

3. Method according to claim 1 wherein said time is at least 10 minutes.

4. Method according to claim 1 wherein the amount of 1,2,3,4-tetrahydronaphthalene in said mixture is 30–70% and the amount of indan is 70–30%.

5. Method according to claim 1 wherein the amount of HF is at least 10 moles per mole of said mixture and the amount of $BF_3$ or $BCl_3$ is at least 0.6 mole per mole of said mixture.

6. Method according to claim 1 wherein the weight ratio of 5,6-cyclopentano-1,2,3,4-tetrahydronaphthalene in the reaction product mixture to the total amount of octahydroanthracene, octahydrophenanthrene, and as-hydrindacene in the reaction product mixture is at least 2:1.

7. Method according to claim 1 wherein the boron compound is $BF_3$.

8. Method which comprises contacting a mixture containing 10–90% 1,2,3,4-tetrahydronaphthalene and 90–10% indan with at least 5 moles liquid HF per mole of said mixture and at least 0.1 mole $BF_3$ or $BCl_3$ per mole of said mixture at a temperature of 0–60° C. for a time sufficient to effect formation of 3-phenylpropyl-1,2,3,4-tetrahydronaphthalene and recovering the latter compound from the reaction product mixture.

9. Method according to claim 8 wherein said temperature is in the range of 20–40° C.

References Cited

UNITED STATES PATENTS 2,884,469  4/1959  McCaulay _____ 260—671 X
3,197,518  7/1965  Chapman et al. _____ 260—668

DELBERT E. GANTZ, *Primary Examiner.*

C. R. DAVIS, *Assistant Examiner.*